March 14, 1939. R. R. RIDGWAY ET AL 2,150,884
APPARATUS FOR MULTIPLE PRESSURE MOLDING
Filed Aug. 30, 1935 2 Sheets-Sheet 1

Inventors
RAYMOND R. RIDGWAY
BRUCE L. BAILEY
By George Beauprey
Attorney

WITNESS
Franklin E. Johnson

March 14, 1939.   R. R. RIDGWAY ET AL   2,150,884
APPARATUS FOR MULTIPLE PRESSURE MOLDING
Filed Aug. 30, 1935   2 Sheets-Sheet 2

WITNESS
Franklin E. Johnson

Inventors
RAYMOND R. RIDGWAY
BRUCE L. BAILEY
By George Bromley
Attorney

Patented Mar. 14, 1939

2,150,884

UNITED STATES PATENT OFFICE 2,150,884

APPARATUS FOR MULTIPLE PRESSURE MOLDING

Raymond R. Ridgway and Bruce L. Bailey, Niagara Falls, N. Y., assignors to Norton Company, Worcester, Mass., a corporation of Massachusetts Application August 30, 1935, Serial No. 38,598

2 Claims. (Cl. 13—22)

The invention relates to apparatus for multiple pressure molding.

One object of the invention is to provide an efficient method for molding a plurality of articles of boron carbide simultaneously. Another object of the invention is to provide an apparatus to carry out the foregoing method. Another object of the invention is to provide a multiple pressure mold of general application. Another object of the invention is to provide a method of and apparatus for rapid production of articles molded under high temperatures and pressure. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

In the accompanying drawings, in which are shown two of various possible embodiments of the mechanical features of this invention, Fig. 1 is a vertical axial sectional view of an electric furnace containing the molding apparatus of the invention and adapted for carrying out of the method.

Figure 1:
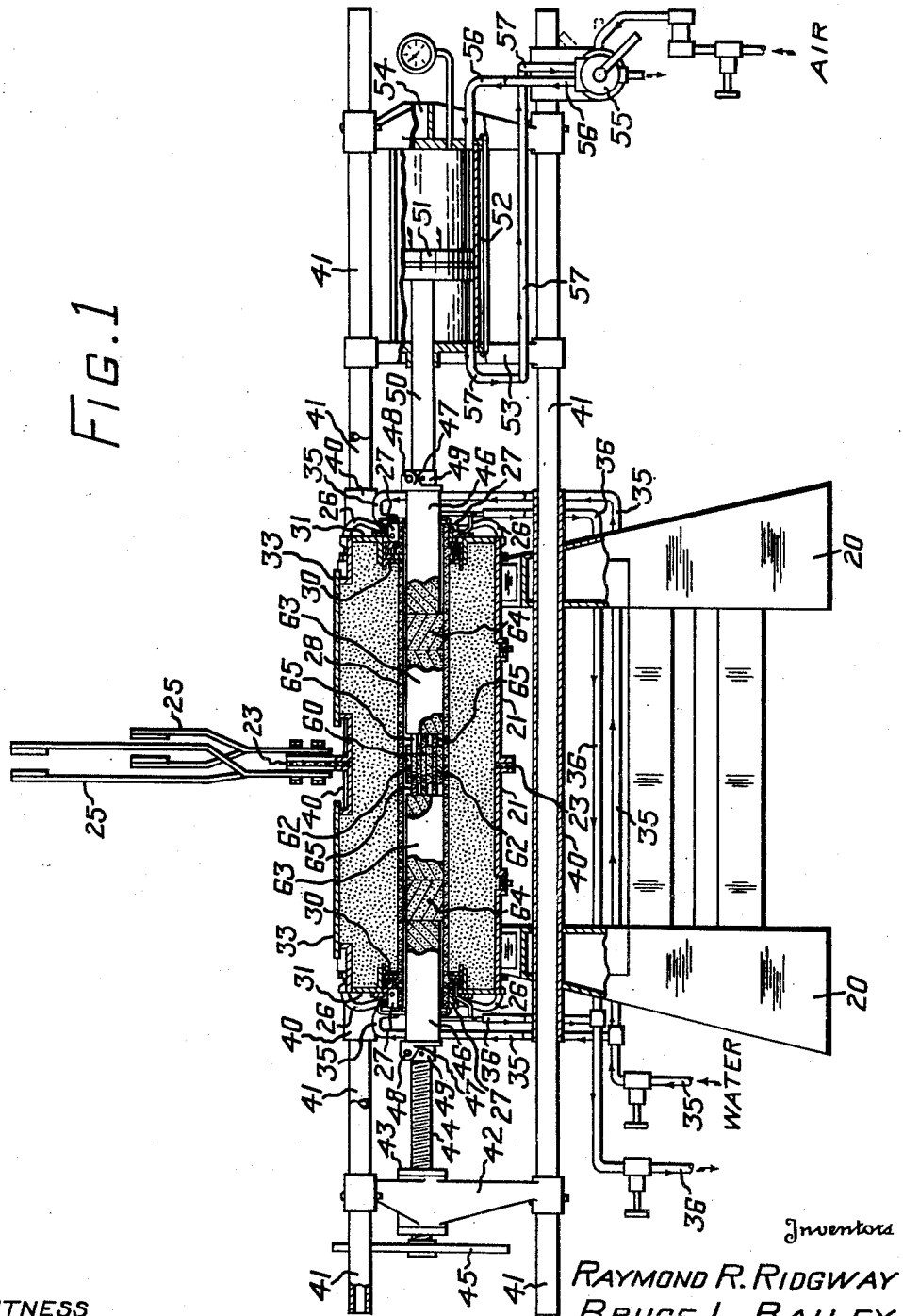

Referring now to Fig. 1, we have therein illustrated in axial section the electric furnace which forms the subject matter of the copending application Serial No. 25,244 of Raymond R. Ridgway, filed June 6, 1935, issued as Patent 2,125,588, dated Aug. 2, 1938. The furnace of the above numbered application may be used with the apparatus and method of this invention, but as other specific furnace constructions may be employed, the illustration of this particular one is for the purpose of disclosing fully the utility of the present invention, excepting in so far as elements of the furnace may be claimed in combination, as to which it is to be considered part of the present invention. In accordance with the foregoing there will be herein described only those features of the furnace of the above numbered copending application as are conducive to a clear understanding of the present invention.

Still referring to Fig. 1, the furnace comprises a pair of standards 20, 20 supporting aluminum cylinders 21, 21 which are, however, suitably insulated from the standards 20, 20 and also from each other as by means of annular insulation 23. Interlaced bus bars 25, 25 lead current into the cylinders 21, 21 and by means of a plurality of conductors 26, 26 at each end of the furnace, which are disposed radially thereof, current is conducted to segmental electrodes 27 which are clamped upon the ends of a graphite tube 28 located in the aluminum cylinders 21, 21 and spaced therefrom by annular glands 30, 30 which are supported by but suitably insulated from end plates 31, 31 of the furnace; thus the construction provides a graphite tube 28 supported coaxially with the aluminum cylinders 21, 21 but free to expand and contract a limited distance without affecting the path of the electric current.

The cylinders 21, 21 are filled with powdered carbon, such as lamp black or the like in order to avoid oxidation of the tube 28 and in order to provide heat insulation. The aluminum cylinders 21, 21 may have covers 33, 33 for introduction of the carbon, and furthermore in case despite precautions carbon monoxide is formed and explodes the covers 33, 33 provide what is in the nature of a safety valve which simply lifts with explosion and thus does no damage to the apparatus. The electrodes 27 as well as the glands 30 are suitably cooled by water cooling apparatus, the details of which will not be described herein, it being merely noted that the water may be introduced through piping 35 and exhausted through piping 36.

The foregoing construction, as more fully described in the copending application referred to, involves low inductance by reason of the radial distribution of the conductors 26 and the cylindrical path of the current in the aluminum cylinders 21 and furthermore provides a current path of low ohmic resistance and thus the furnace utilizes a very high percentage of the KVA input in heating the resistance element 28. As an example of the characteristics of such a furnace we note that at molding temperature, which is or may be around 2200° C., the electrical quantities may be of the following order:

|  | Power input, k. w. | Amperes | Volts | Microhms | 25 cycles | | | 60 cycles | | |
|---|---|---|---|---|---|---|---|---|---|---|
|  |  |  |  |  | Z | X | P. F. | Z | X | P. F. |
| Start of run | 61.2 | 5,880 | 10.6 | 1.77 | 1.8 | .332 | .983 | 1.94 | .798 | .912 |
| At molding temp | 8.28 | 1,600 | 5.2 | 3.235 | 3.25 | .332 | .995 | 3.33 | .798 | .971 |

In the above table Z and X are given in michroms while P. F. represents power factor.

Still referring to Fig. 1, extending through the standards 20, 20 (which as more clearly illustrated in the copending application referred to are Y-shaped, their upper portions being in the form of broken annuli partially surrounding the cylinders 21, 21) are three tubes 40 the axes of which are parallel to the axis of the furnace and of the tube 28, and the axes of which are located equidistant from the axis of the furnace and furthermore are spaced at equal angular distances around the furnace, viz., 120° apart.

Thus tubes 40 comprise the supports for three thrust rods 41 by means of which pressure is exerted upon the mold apparatus and the substance to be molded inside of the tube 28 without imparting any strain to the graphite tube 28. As shown in Fig. 1, a spider 42 is supported by the rods 41 and has an internally threaded hub 43 receiving a screw 44 which may be actuated by a hand wheel 45. A plunger 46 of graphite is screwed to a plate 47 which is pivotally mounted at 48 on a collar 49 secured to the screw 44, but in the position of parts shown in Fig. 1 axial thrust is transmitted by abutment of the plate 47 against the collar 49.

At the other end of the machine there is a similar graphite plunger 46 screwed to a similar plate 47 pivoted on a similar pivot 48 attached to a collar 49 which collar however is fastened to the end of a piston rod 50. Piston rod 50 extends from a piston 51 which is located in a cylinder 52, which cylinder is supported by a pair of spiders 53 and 54 each of which is secured to the rods 41. By means of a three position valve 55 air or the like may be admitted through piping 56 and 57 to one or the other side of the piston 51 thus to force the graphite plunger 46 which is attached to the piston rod 50 towards the other graphite plunger 46. It will be seen that by reason of the construction described, pressure may be exerted inside the heating tube 28 in an axial direction thus resulting in a minimum of strain on said tube commensurate with the pressure employed; and furthermore it will be seen that the apparatus may be quickly adjusted for different sizes of molds and the plungers 46 may be swung in a plane radial of the furnace after being removed therefrom, the more readily to permit access to the graphite tube 28 for the purpose of placing therein and removing therefrom the molding apparatus which is more particularly the subject matter of this present invention.

Figure 2:
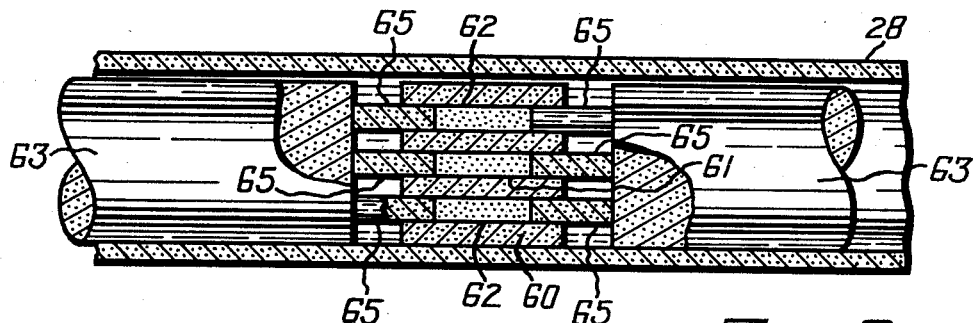
Fig. 2 is an enlarged sectional view of the molding apparatus.
Figure 4:
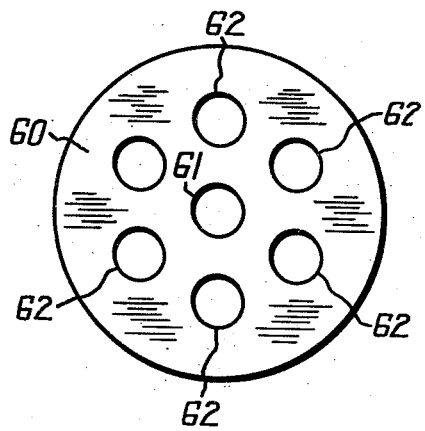
Fig. 4 is an end elevation of one of the molds.

Referring now to Figs. 2 and 4, we provide a graphite mold 60 comprising an originally solid cylinder of graphite having an axial bore 61 and a number of bores 62 which are parallel to the axis of the cylinder with centers equally spaced on a circle concentric with the axis of the mold. Any other disposition of the bores 61 and 62 however may be adopted but in order to avoid the setting up of couples or strains they are preferably all parallel to each other and parallel to the axis of the mold 60.

Considering now Fig. 1 in connection with Fig. 2, we show the mold 60 in approximately the center of the graphite tube 28, and on either side thereof is a cylindrical block 63 also of graphite. Abutting the blocks 63 are blocks 64 of graphite, a plurality of blocks being used to permit the apparatus to operate upon molds of different length. The blocks 63 and 64 are spacers and are abutted by the plungers 46 which apply and receive the pressure. By reason of the provision of the blocks 63 and 64, only one set of which will be used upon certain occasions, we are enabled to use a long graphite resistance tube 28 in order to obtain the desired electric resistance, without unwieldy and expensive plungers 46 and also while maintaining the plungers 46 outside the zone of the hottest temperature, thus prolonging their life, it being understood that the blocks 63 and 64 may be more readily replaced as they are not fastened to anything.

In the operation of charging the furnace, we provide a number of small graphite plunger rods 65 of a size to fit with a close sliding fit the bores 61 and 62, and of a total number equal to twice the number of all such bores, and all of the same length. It is desirable during the fusing operation to maintain an equal unit pressure on each of the graphite plunger rods 65 which in turn exert equal pressures on the grain or powder in the bores 61 and 62. This is accomplished by making the combined length of both graphite rods in any bore the same as the combined length of both graphite rods in each other bore, and in addition using in all compartments of the mold, grain or powder which has the same shrinkage characteristics. The grain or powder in each compartment will then contract at the same rate and in equal amount when heat and pressure are applied during the furnace operation, with the result that the pressure applied remains divided proportionately among all the compartments of the mold and the unit pressures on the graphite rods will be equal, generating no force couple. We place one-half the total number of plungers 65 in one end of the mold 60 projecting by a uniform amount therefrom, and then from the other end we fill the bores with a measured quantity of the substance to be molded, for example boron carbide ($B_4C$).

Boron carbide is one example of substances which can be molded under heat and pressure in the apparatus of the invention, but the molding apparatus and method may be applied to other substances. One reason for applying pressure simultaneously with heat for the manufacture of boron carbide articles is that boron carbide fuses at a temperature so high that scarcely any substance other than graphite is practical and commercially available for use as a container or mold, and in order to prevent any substantial amount of graphite from going into solution in the boron carbide, pressure is used, as thereby the time required at the highest temperature is greatly reduced.

Boron carbide or other substance introduced into the mold is preferably in a finely divided or powdered condition. We fill each mold cavity 61 and 62 with an equal and carefully measured (by weighing) amount of grain or powder. We then insert the remainder of the plungers 65 into the other end of the mold, the mold being long enough to contain the required amount of material, leaving a substantial amount of the plungers 65 in the mold at the commencement of the molding operation, as shown in Fig. 2. In order that the mold 60 with its plungers may be more readily handled, we prefer to transfer the mold and plungers immediately to a press, and compact the grain or powder by cold pressing, maintaining the protruding ends of the graphite rods at each end in a plane perpendicular to the axis of the mold. It is desirable that the rods protrude about the same distance from each end of the mold.

Thereupon we introduce the mold into the center of the furnace as shown in Fig. 1, and then sliding first a block 63 and then a block 64 into the left-hand end of the furnace we run the plunger 46 into the furnace and into contact with the block 64, then introducing a block 64 and a block 63 into the right-hand end of the furnace we slowly move the other plunger 46 carried by the piston rod 50 into position until all parts are in abutment. At this time the plungers 65 project from the mold 60 at each end thereof. We now turn on the current and apply the pressure and when the desired temperature, around 2200° C., is reached, the current is shut off and the furnace is allowed to cool.

While the boron carbide is fusing, pressure is applied to the maximum extent for that particular material. What pressure is used depends upon the material being molded and the mesh of the grain or powder, more pressure being required for a coarser grain. We have achieved satisfactory results in practice with boron carbide grain of 200 mesh size, and for the manufacture of certain articles and under the conditions of grain size and temperature already mentioned, a pressure of around one thousand pounds to the square inch may be employed.

The multiple molding of a plurality of objects simultaneously saves a great deal of time in the manufacture of such articles and the cost thereof is considerably less than where one article is molded for each run of the furnace. We are enabled to duplicate results by reason of the fact that the amount of material in each bore of the mold is the same as in every other and the pressure is evenly divided so as to generate no couples or torsional strains. In fact, despite the high pressures used, and in some cases pressures very much in excess of 1000 lbs. to the square inch may be employed, we are enabled to use a long graphite resistance tube 28 without fracturing it, for virtually the only downward pressure which it has to support is the weight of the parts.

Figure 3:
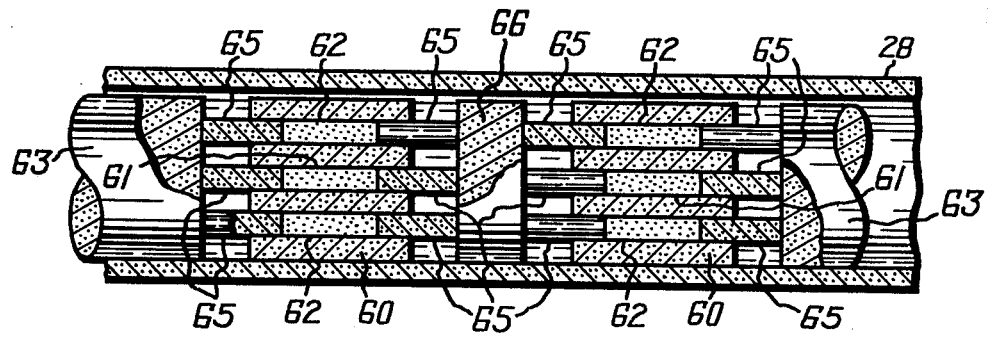
Fig. 3 is an axial sectional view similar to Fig. 2 illustrating a modification of the invention.

Referring now to Fig. 3, we may double the production for a particular run of a furnace by using two molds 60 set up as already described. In such event we may leave out the blocks 64, for example, inserting a central block 66 as clearly shown in Fig. 3. In filling the tube 28 it is desirable to align the bores 62 of one mold 60 with the bores 62 of the other mold 60 so that the strain on the block 66 will be merely compression and not a shearing force.

We have shown the tube 28 as a hollow cylinder, which is the preferred construction for both manufacturing and operating reasons, but other shapes of the heating or containing element could be employed. I have shown the mold 60 as a cylinder with cylindrical bores, but for the production of articles other than cylinders the mold cavities will be of other shapes, and the configuration of the mold itself may be different. Likewise the shape of the parts may be varied and the mold cavities may be other than uniform in cross section. A feature of the invention is the disposition of the areas of the orifices of the mold cavities so that by the laws of leverage no couple is generated and the center of thrust receiving resistance is coaxial with the center of thrust, and while this is achieved by the symmetrical arrangement shown, it may also be achieved by other arrangements. The variour parts of the apparatus which are subject to the high heat generated are made of graphite because this is, so far as we are aware, the only substance which will stand such high temperatures without substantial chemical change or without fusing and which is also commercially available at reasonable prices and can be shaped without undue expense. Graphite, however, is very weak mechanically at high temperatures so far as shearing or tensional stresses are concerned, although it has a fairly high resistance to compression. Accordingly the apparatus of the invention, which permits the molding under heat and pressure without causing cross bending stresses, is of great utility when embodied in graphite heating, pressure and molding apparatus.

The apparatus may be used for continuous molding in which a plurality of molds are arranged in tandem relation as shown in Fig. 2, molds being inserted at one end of the furnace and taken out at the other end thereof, and the high temperature being maintained more or less continuously. This may be achieved by withdrawing both graphite plungers 16 when it is desired to remove a mold from one end and place a mold in position in the other end. Adoption of this method greatly accelerates production and is rendered possible by the mechanical features of this invention already described.

It will thus be seen that there has been provided by this invention a method and apparatus in which the various objects hereinabove set forth together with many practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

We claim:

1. Apparatus for molding under heat and pressure comprising an elongated graphite tube, means to pass electric current through said tube to heat it, pressure plungers in each end of said tube, pressure means exerting a thrust against one of said plungers, the center of pressure being coaxial with the bore of the tube, and a graphite mold in the tube between the pressure plungers having a plurality of parallel bores, each parallel to the axis of the tube and all of them located symmetrically with respect to the tube, and a pair of small plungers in each of said bores, all of them parallel to the tube and to each other, whereby to mold under heat and pressure a plurality of objects at a single operation, the pressure apparatus, by reason of the aforesaid features, generating no couple.

2. Apparatus for molding under heat and pressure comprising a cylindrical graphite tube of great length as compared to its diameter and adapted to transmit electric current, thereby to heat it, a graphite mold block cylindrical in shape just fitting in said tube and having a plurality of bores arranged symmetrically about its cylindrical axis, the axes of said bores being all parallel to said axis of said cylindrical graphite mold and the axis of said graphite tube, a cylindrical graphite plunger in each end of each of said bores, and a cylindrical graphite plunger in each end of said tube.

RAYMOND R. RIDGWAY.
BRUCE L. BAILEY.